No. 671,335. Patented Apr. 2, 1901.
W. D. FORSYTH & E. T. BELL.
BOILER TUBE CLEANER.
(Application filed July 17, 1899.)
(No Model.) 5 Sheets—Sheet 1.

WITNESSES:
Edwin G. McKee.
G. M. Anderson

INVENTORS
W. D. Forsyth
Enos T. Bell
BY
E. W. Anderson
Their ATTORNEY.

No. 671,335. Patented Apr. 2, 1901.
W. D. FORSYTH & E. T. BELL.
BOILER TUBE CLEANER.
(Application filed July 17, 1899.)

(No Model.) 5 Sheets—Sheet 2.

WITNESSES:
Edwin G. McKee
G. M. Anderson

INVENTORS
W. D. Forsyth
Enos T. Bell
BY
E. W. Anderson
their ATTORNEY.

No. 671,335. Patented Apr. 2, 1901.
W. D. FORSYTH & E. T. BELL.
BOILER TUBE CLEANER.
(Application filed July 17, 1899.)
(No Model.) 5 Sheets—Sheet 3.

No. 671,335. Patented Apr. 2, 1901.
W. D. FORSYTH & E. T. BELL.
BOILER TUBE CLEANER.
(Application filed July 17, 1899.)
(No Model.) 5 Sheets—Sheet 4.

No. 671,335.                                            Patented Apr. 2, 1901.
W. D. FORSYTH & E. T. BELL.
BOILER TUBE CLEANER.
(Application filed July 17, 1899.)
(No Model.)                                             5 Sheets—Sheet 5.

WITNESSES:
Edwin G. McKee.
G. M. Anderson

INVENTORS
W. D. Forsyth
Enos T. Bell
BY
E. W. Anderson
ATTORNEY.

UNITED STATES PATENT OFFICE.

WILBER D. FORSYTH AND ENOS T. BELL, OF PITTSBURG, PENNSYLVANIA, ASSIGNORS TO THE UNION BOILER TUBE CLEANER COMPANY, OF SAME PLACE.

BOILER-TUBE CLEANER.

SPECIFICATION forming part of Letters Patent No. 671,335, dated April 2, 1901.

Application filed July 17, 1899. Serial No. 724,169. (No model.)

*To all whom it may concern:*

Be it known that we, WILBER D. FORSYTH and ENOS T. BELL, citizens of the United States, and residents of Pittsburg, in the county of Allegheny and State of Pennsylvania, have invented certain new and useful Improvements in Mechanism for Cleaning Boiler-Tubes; and we do declare the following to be a full, clear, and exact description of the invention, such as will enable others skilled in the art to which it appertains to make and use the same, reference being had to the accompanying drawings, and to letters and figures of reference marked thereon, which form a part of this specification.

In the drawings, Figure 1 is a plan view of our invention as applied, the boiler being shown as in section. Fig. 1$^a$ is a detail view of the pulley-carrying frame 46 and its clamps. Fig. 1$^b$ is a detail view of the cross-bar 38 and adjacent parts. Fig. 2 is a side elevation of our invention as applied, the boiler being shown as in section. Fig. 2$^a$ is a detail view of the handle 29. Fig. 12 is a detail view of one of the sleeves 21.

This invention relates to mechanism for the operation of boiler-tube-cleaning implements in water-tube boilers of the type having vertical tubes, such as the "Cahall," "Cook," and other boilers of this class. In as far as we are aware no device has yet been produced or placed upon the market adapted to the purpose of cleaning water-tube boilers of this type in a practical and satisfactory manner; and the present invention has for its object generally the provision of means for use in connection with the various tube-cleaning devices which we have heretofore patented, whereby the tubes of this class of boilers may be thoroughly cleaned in an expedient and practical manner.

With this object in view the invention consists in the novel construction and combination of parts, all as hereinafter described, and pointed out in the appended claims.

In the accompanying drawings we have shown the invention as applied for use in a Cahall boiler.

In the drawings the letter A designates the annular drum of the boiler, from the bottom of which lead the water-tubes B and in one side of which is a manhole C.

The numeral 1 designates what may be termed a "base-plate," having a concave inner face adapted to fit against the inner wall of the annular drum, extended downwardly to rest upon an annular flange $a$ of the bottom of the drum and which is also supported by a foot or bracket 2, which rests upon the bottom of the drum. The arms 2$^a$ of this foot or bracket are slotted vertically, as shown at 2$^b$, to seat the securing-bolts 2$^c$ and to provide for the vertical adjustment of the base-plate. Rigidly secured to this base-plate is a horizontal radially-projecting arm 3, which is further supported by a vertically-adjustable foot 4, which rests on the bottom of the drum and is secured to a collar 4$^a$ on said arm. In the outer end of said arm is an adjustable screw-stud 5, which has ball-bearing against a block 5$^a$ on the outer wall of the drum and which is adjusted by turning a nut portion 6 thereof. The arm 3 is provided with a longitudinally-extending keyway 3$^a$, which is engaged by a feather 7$^a$ of a clamp 7, carried by an arm 8, which extends at right angles to the arm 3, and is supported at its distant end by an adjustable leg 9. Said arm 8 is formed with a keyway 8ª, which is engaged by a key or feather 10ª of a clamp-plate 10. This keyway is considerably wider than the thickness of the engaging key 10ª, thus allowing said plate to turn on said arm to a limited degree when the clamp is loosened for the purpose hereinafter stated. Said plate 10 is of circular form and is provided with opposite elongated arcuate slots 10ᵇ to receive screw-bolts 11ª, which are seated in one end portion of a radial arm 11. Said arm 11 is pivoted to swing from the center of the plate 10 when said nuts are loosened to the extent permitted by the slots 10ᵇ. Journaled to the inner portion of said arm 11, upon the pivot upon which it swings upon a stud 11ª thereof, is a gear-wheel 12, and above this gear-wheel and rigidly secured thereto to turn upon said stud is a grooved pulley or sheave 13, to which the driving power is applied, as hereinafter described. Journaled to the intermediate portion of the said arm 11 is a smaller gear-wheel 14, in mesh with and driven by the gear-wheel 12 and in turn meshing with and driving a larger gear-wheel 15, journaled to the outer end portion of the said arm, as hereinafter more fully described.

Figures 8, 10:
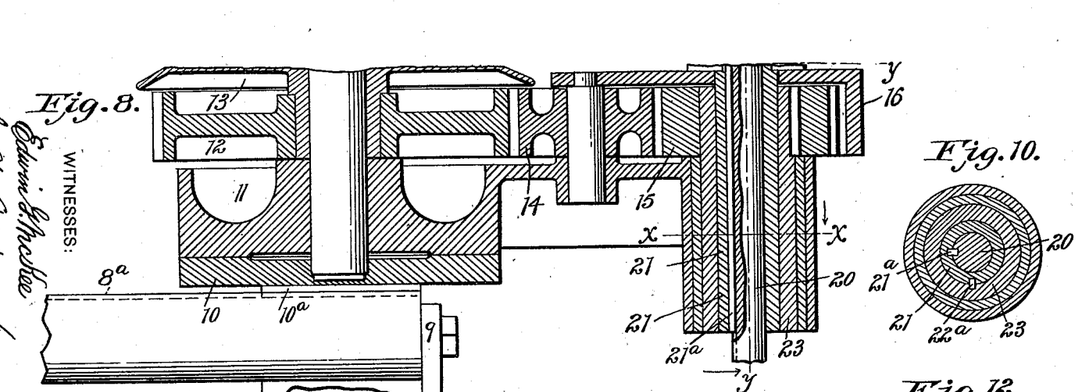
Fig. 8 is a detail view of the spur gear-wheels 12, 14, and 15 and adjacent parts.
Fig. 10 is a section on the line $xx$, Fig. 8.
Figure 9:
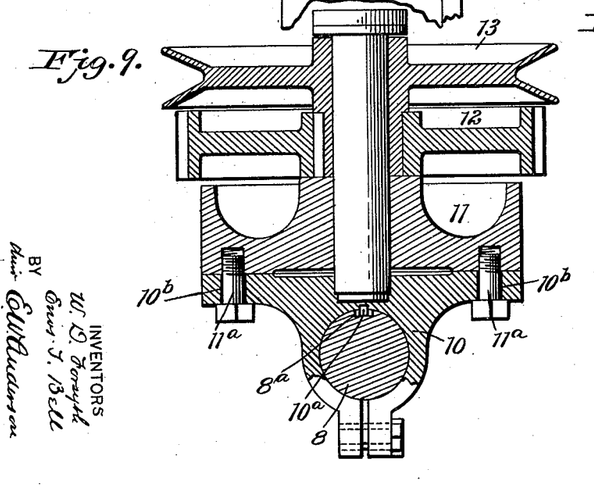
Fig. 9 is a cross-section through pulley 13, clamp-plate 10, and intermediate parts.
Figure 11:
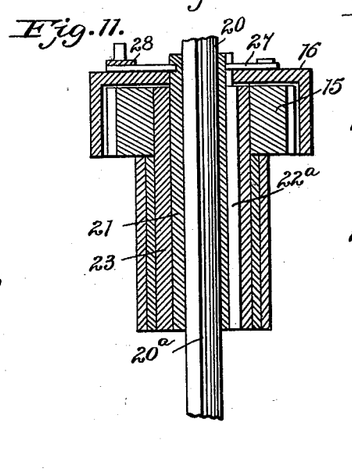
Fig. 11 is a section on the line $yy$, Fig. 8.
Figure 13:
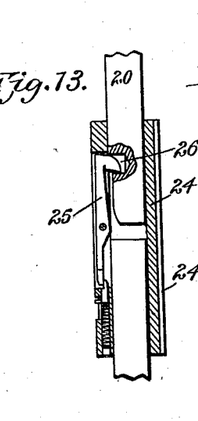
Fig. 13 is a detail view illustrating the coupling for the sections of the rod 20.
Figure 14:
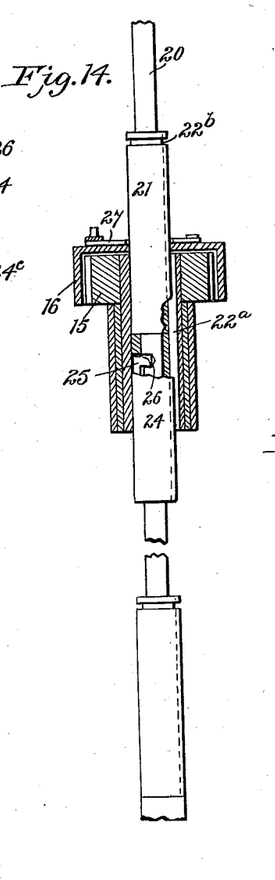
Fig. 14 shows the coupling of a rod-section as effected and the section ready to be moved down and secured by the latch-plates 27.

16 designates a guard or casing over the gear-wheel 15.

17 designates the boiler-tube-cleaning head or implement, which may be of the jointed or non-jointed type, which we have described and claimed in former patents.

18 is a winged guide device which is adapted to pass through the tube with the head and which is connected to the head by a universal joint 19.

20 is the sectional feed and carrying rod for the cleaner-head, formed with a longitudinal keyway 20ª, arranged to slide on the key 21ª of a sleeve 21. This sleeve is formed with an external keyway 21ᵇ, which is fitted to engage a key or spline 22ª of a short hollow shaft or quill 23, to which the gear-wheel 15 is keyed and which is rotatably seated in a bearing in the arm 11. From this construction and arrangement it will be seen that rotary movement of the gear-wheel 15 and shaft or quill 23 will be imparted to the rod 20, while at the same time said rod is capable of endwise or vertical movement through said gear-wheel.

The sections of the rod 20 are coupled together by means of sleeve-couplings 24, inclosing the adjacent end of said sections. These couplings are each rigidly secured to one of the sections which they connect and are each provided with a spring-latch 25, adapted to snap into engagement with radial openings 26 therefor in the end portion of the adjacent section. The sleeve 21 of each rod while the latter is being fed through the gear-wheel 15 is held in position in said wheel by means of latch-plates 27, pivoted at 27ª in the guard or casing 16, before referred to. These plates engage an annular groove 22ᵇ in the said sleeve 21 and are held in engaging position by a keeper 28, which clamps their free end portions. The upper rod-section is provided with a swiveled handle 29, by means of which the operator within the drum controls the operation. The hub portion of this handle is provided with a bail or loop 30, to which is attached a rope 31, which passes up to the top of the drum and over pulleys 32, 33, and 34, its free end being weighted, as at 35. In addition to this weight 35 smaller detachable weights 36, similar to scale-weights, are provided. Pulleys 32 and 33 are carried by a sleeve 37, which is slidably mounted on a cross-bar 38 and secured in the desired position thereon by means of a set-screw 40. Said bar 38 is secured at one end to a block or plate 41, which bears against the outer wall of the boiler-drum and at its opposite end carries an adjustable screw-stud 42, which has a bearing against a piece 43ª, connected to a block or plate 43, which seats against the inner wall of the drum. The stud 42 is provided with an adjusting portion 44, by means of which it is adjusted to press the blocks 41 and 43 against the walls of the drum. These blocks rest on the rivet-heads X of the drum, which support them when the pressure of the bar 38 is released, so that said parts may be moved from one place to another in the drum or removed without danger of their falling. The manner in which these pulleys are supported permits them to be quickly adjusted in order to bring the pull on the rope 31 in line with the feeding-rod. The pulley 34 hooks into the manhole H in the top of the boiler and carries the rope and counterweight back out of the way of the operator within the drum.

Power is applied to the sheave or pulley 13 by means of a rope, belt, or cable 45, which is brought into the drum through the manhole C.

Figures 1, 1A, 1B:
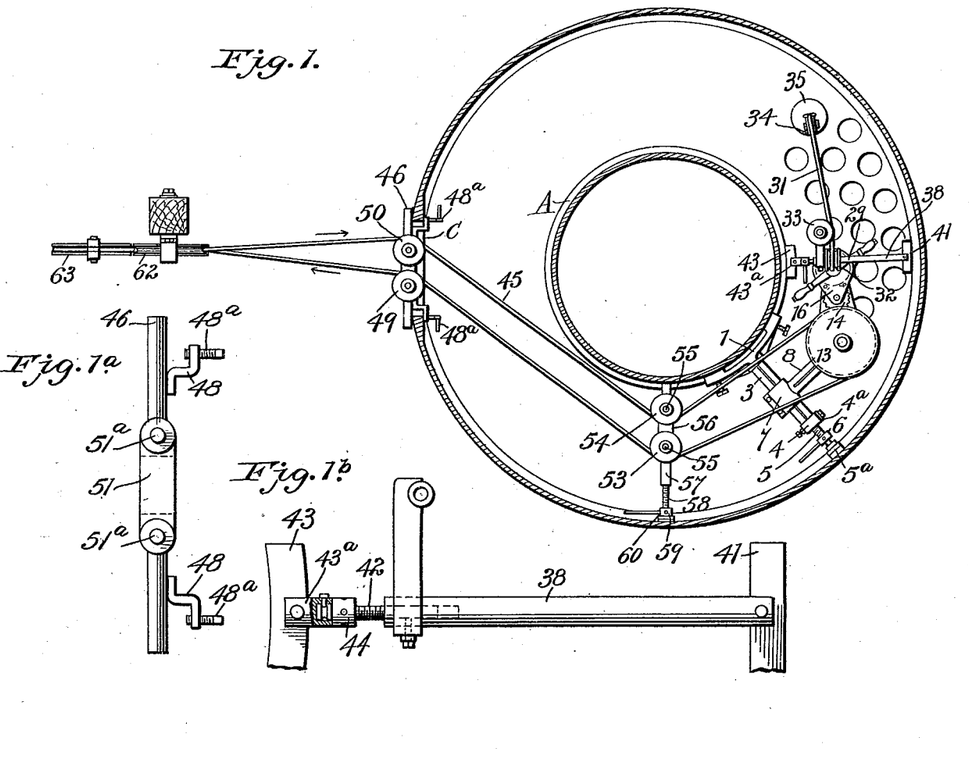

46 is a pulley-carrying frame or shaft provided with clamps 48. These clamps are made to enter neatly the manhole at the center and then drop to a point where the clamp-screws 48ª may secure a firm hold on the wall of the drum adjacent to the hole. The twin idle pulleys 49 and 50 are loosely journaled on studs 51ª of the block 51, which is slidably mounted on the shaft 46 and is secured in the desired position by a set-screw 51ᵇ. The pulley 49 forms a guide for the ingoing branch of the driving rope or cable, while the pulley 50 forms a guide for the outgoing branch of the same. These two pulleys may, however, be mounted on separate blocks, as shown in drawing.

53 and 54 designate two intermediate idle pulleys, which are for the purpose of carrying the rope or belt around the interior wall of the drum, as shown, or around braces which may be encountered in other similar types of boilers. These pulleys are loosely journaled on studs 55 of a block 56, which is slidably mounted on a rod 57. Said pulleys may, however, be mounted on separate blocks. The inner end of said rod has a bearing against the inner wall of the drum, and its outer end has a screw-stud 58, which bears against a block 59, resting against the outer wall of the drum. Stud 58 has an adjusting portion 60.

Although forming no part of our invention, we have shown a suitable arrangement of rope or belt guiding pulleys 61, 62, and 63 exteriorly of the drum.

Figures 2, 2A:
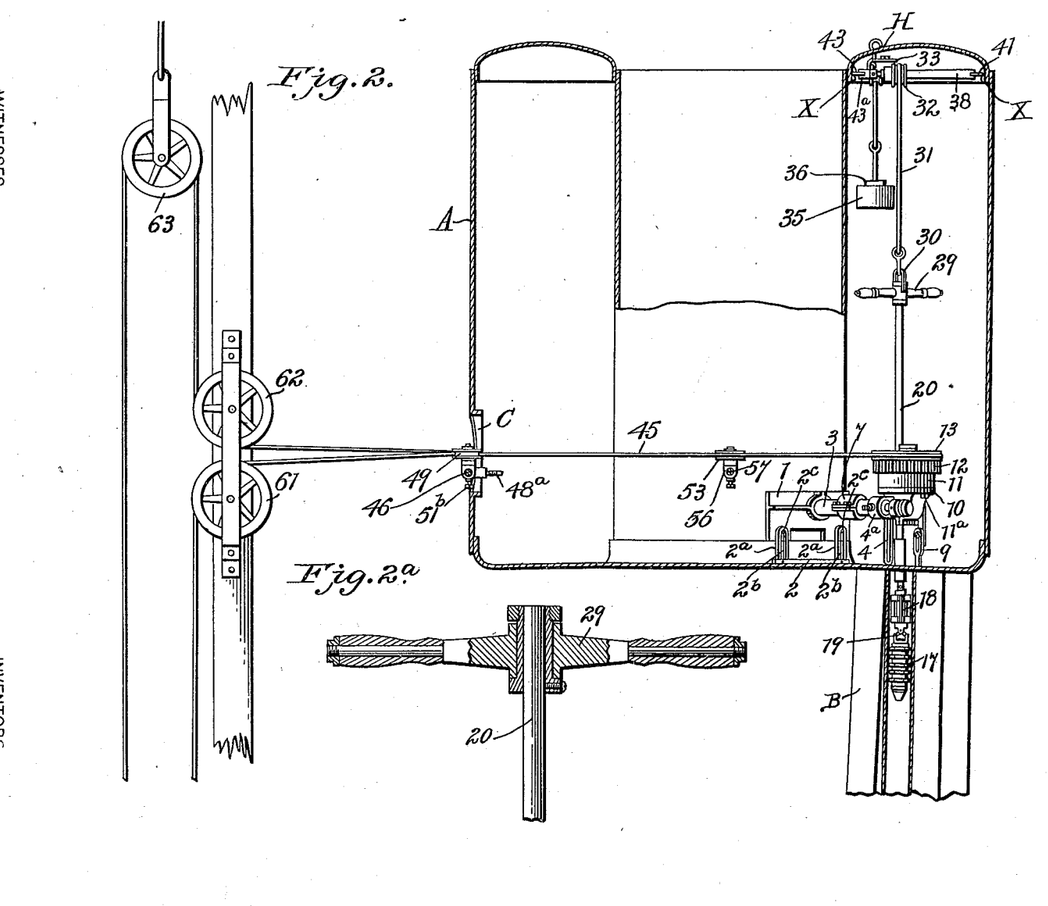
Figures 3, 4, 5, 6, 7:
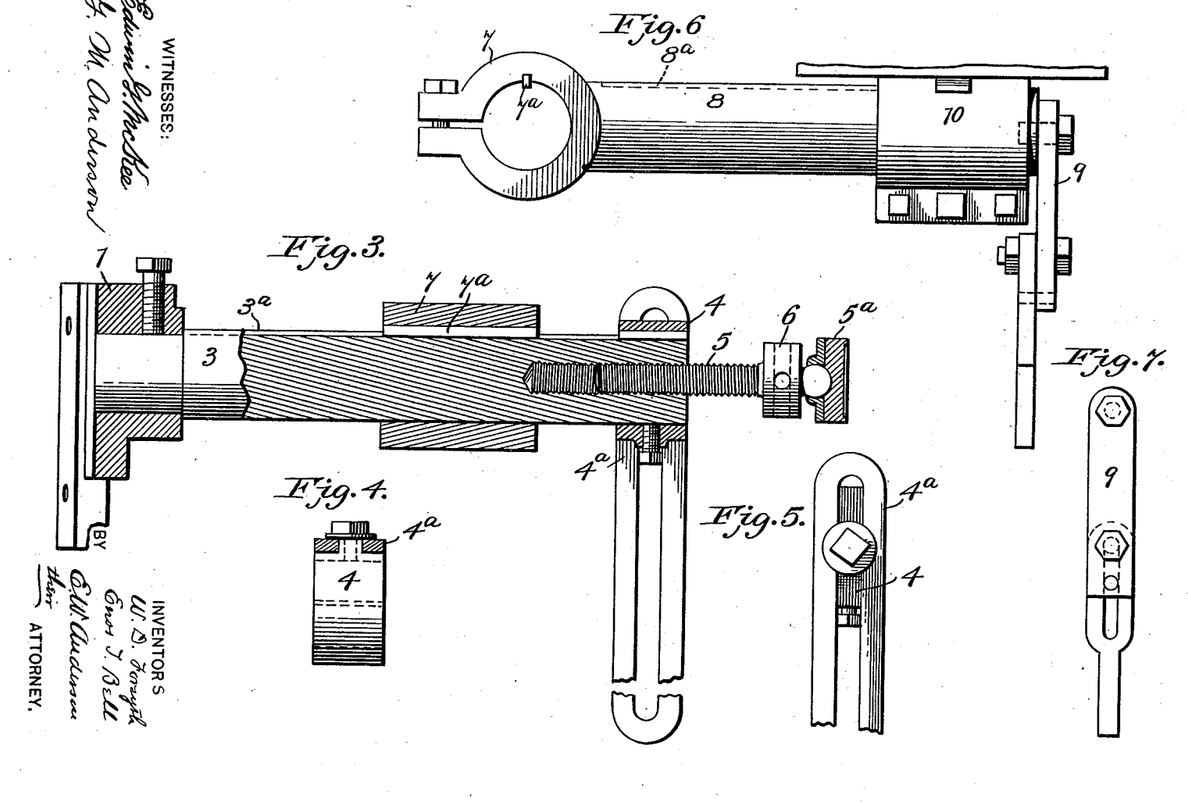
Fig. 3 is a detail view of base-plate 1, arm 3, foot 4, and adjacent parts.
Fig. 4 is a sectional detail view illustrating the adjustable connection of the foot 4 and collar 4$^a$.
Fig. 5 is a fragmentary side elevation of said foot 4 and collar 4$^a$.
Fig. 6 is a detail view of the arm 8, leg 9, and adjacent parts.
Fig. 7 is a detail view of the leg 9.
Figure 15:
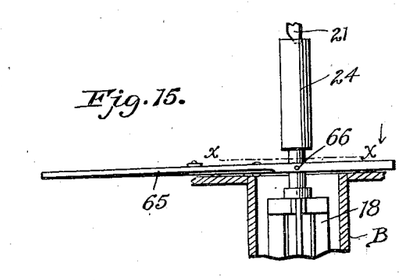
Fig. 15 is a detail side elevation showing the supporting-tongs 65 in engagement with one of the rod-sections.
Figure 16:
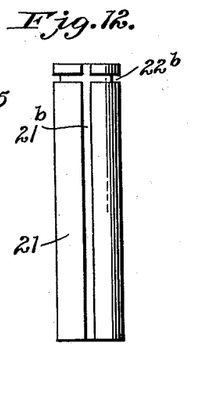
Fig. 16 is a section on the line $xx$, Fig. 15.
Figures 16, 17, 18:
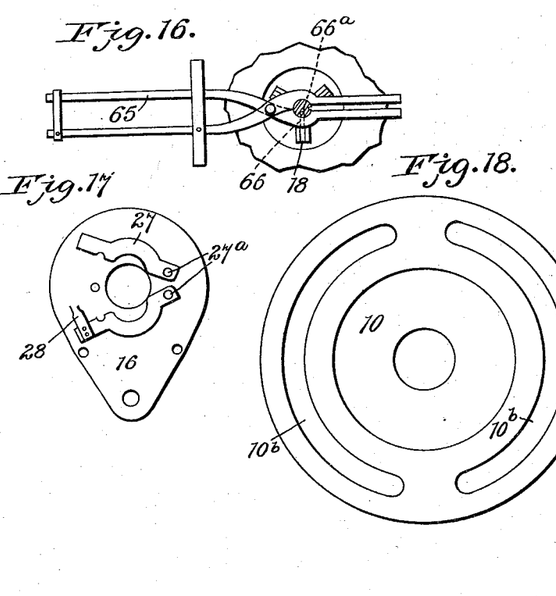
Fig. 17 is a detail view of the latch-plates 27 when separated.
Fig. 18 is a detail view of clamp-plate 10.

The parts having been set up in the drum in the manner shown in Fig. 2, the mode of operation is as follows: The cleaning-head is inserted in the top of the tube to be cleaned and is supported by suitable means, such as the tongs 65, (shown in Fig. 15,) which are provided with a pin 66, which enters a hole 66$^x$ in the rod just above the cleaner-head and guide, the tongs lying across the top of the tube. The arm 11 is then swung into proper position and locked by means of the screw-bolts 11$^a$. The feed-rod is then thrust through the gear-wheel 15 and is connected to the head by means of one of the couplings 24. The rod-sleeve 21 is then secured by means of the latch-plates 27. The handle 29 is next attached to the rod and also to the counterweighted rope 31. The tongs 65 are then removed and power is applied, the feed-rod being rotated by the gearing above described and its operation controlled by the operator through the handle—that is to say, the operator by means of this handle controls the rate of feed of the cleaner-head. When the rod is fed its length, the power is stopped, the tongs 65 are engaged with a hole in said rod immediately below the handle, the handle is removed, another section of rod coupled on, and the handle replaced. The latch-plates 27 are then opened to allow the coupling to pass through the gear-wheel 15, after which they are closed to engage the sleeve of the rod-section last coupled. The couplings are formed with keyways 24$^c$, which engage the key in the hollow shaft 23, so that the feed-rod continues to be rotated during the time the coupling is passing through said shaft or quill. This operation is repeated, and as many rod-sections are successively coupled on as may be necessary until the cleaner-head reaches the lower end of the tube, after which they are withdrawn and uncoupled, being supported by the tongs 65 while being uncoupled. The cleaner-head is then placed in the next tube, the radial arm 11 is properly adjusted to bring the gear-wheel 15 in line therewith, and the operation is repeated. When all the tubes within the radius of the movement of the arm 11 have been cleaned, the clamp-plate 10 may be adjusted on the arm 8 to give the arm 11 a movement over a different set of tubes, or when necessary the base-plate 1, with the parts carried thereby, can be moved to a different position in the drum, said plate and parts being readily movable to any desired position in the drum. To reach the tubes on the opposite side of the boiler, the machine is reversed by changing the arm 8 to cause it to project in the opposite direction to that in which it is shown in the drawings, the idle pulleys for the driving belt or rope and the pulleys for the counterweighted rope being adjusted to suit the changed conditions.

It will be readily understood that the radial arm 11 can be moved to any position within its limit of movement without affecting the operation of the driving-gear for the feed-rod.

The play permitted by the loose engagement of the key 10$^a$ with the keyway 8$^a$ above described allows angular adjustment of the driving-gear to suit the pitch of the tubes.

Having thus described our invention, what we claim as new, and desire to secure by Letters Patent, is—

1. In mechanism for operating boiler-tube cleaners, the combination with an adjustable support and a driving-wheel carried thereby, of a tube-cleaning implement, a feed-rod therefor rotatably connected with said wheel, a rope or the like attached to said rod, and carrying a counterbalancing-weight, an adjustable support above said rod, and a guide-pulley for said rope adjustable upon said last-named support, to keep said rope in line with said implement and with the tube to be cleaned, substantially as specified.

2. In mechanism for operating boiler-tube cleaners, the combination with an adjustable support and a driving-wheel carried thereby, of a tube-cleaning implement, a feed-rod therefor rotatably connected with said wheel, a rope or the like attached to said rod, and carrying a counterbalancing-weight, an adjustable support above said rod, guide-pulleys for said rope at right angles to each other adjustable upon said last-named support, a third guide-pulley for said rope in rear of said first-named pulleys, substantially as specified.

3. In mechanism for the purpose described, the combination with an adjustable support and a driving-wheel carried thereby, of a tube-cleaning implement, a feed-rod therefor rotatably connected with said wheel, a rope or the like attached to said rod and carrying a counterbalancing-weight, a support above said rod, an adjustable block upon said support, guide-pulleys for said rope at right angles to each other upon said block, and a third guide-pulley for said rope having a hooked supporting-frame in rear of said first-named pulleys, substantially as specified.

4. In mechanism for the purpose described, the combination with an adjustable support and a wheel carried thereby, of a tube-cleaning implement, a feed-rod therefor rotatably connected with said wheel, a belt or the like for driving said wheel, adjustable guide-pulleys for said belt in the manhole of the boiler, adjustable guide-pulleys for said belt intermediate of said manhole and wheel, and means exterior of the boiler for driving said belt, substantially as specified.

5. In mechanism for the purpose described, the combination with an adjustable support and a wheel carried thereby, of a tube-cleaning implement, a feed-rod therefor rotatably connected with said wheel, a belt or the like for driving said wheel, a bar or shaft in the manhole of the boiler, a block or blocks adjustable upon said bar, guide-pulleys for said belt upon said block or blocks, a bar or shaft intermediate of said manhole, and wheel, a block or blocks adjustable upon said last-named bar, guide-pulleys for said belt carried by said last-named block or blocks, and means exterior of the boiler for driving said belt, substantially as specified.

6. In mechanism for the purpose described, the combination with boiler-tube-cleaning devices, and a driving-belt therefor, of a bar or shaft carrying guide-pulleys for said belt and having clamps adapted to neatly enter the manhole of the boiler at its center and to be dropped into position to engage the walls of the boiler-drum adjacent thereto, and means for driving said belt, substantially as specified.

7. In mechanism for the purpose described, the combination with a support and a driving-wheel carried thereby, of a tube-cleaning implement, a sectional feed-rod therefor rotatably engaging said wheel, and having recesses therein at one end of the sections thereof, coupling-sleeves for the sections of said rod, and having pivoted latches extending lengthwise thereof, and engaging the recesses of said rod-sections, and means for securing said latches from disengagement, substantially as specified.

8. In mechanism for the purpose described, the combination with a support and a driving-wheel carried thereby, of an endwise-movable sleeve rotatably connected with said wheel, a tube-cleaning implement, a sectional feed-rod therefor rotatably connected with said sleeve, and having recesses therein at one end of the sections thereof, couplings for the sections of said rod having pivoted latches extending lengthwise thereof and engaging the recesses of said rod, means for securing said latches from disengagement with such recesses, and means for supporting said sleeve, substantially as specified.

9. In mechanism for the purpose described, the combination with a support and a driving-wheel carried thereby, of an endwise-movable sleeve rotatably connected with said wheel, a tube-cleaning implement, a sectional feed-rod therefor rotatably connected with said sleeve, couplings for the sections of said rod rotatably connected with said wheel, and means for supporting said sleeves, substantially as specfied.

10. In mechanism for the purpose described, the combination with a support and a driving-wheel carried thereby, of an endwise-movable sleeve rotatably connected with said wheel, a tube-cleaning implement, a sectional feed-rod therefor rotatably connected with said sleeve, couplings for the sections, of said rod rotatably connected with said wheel, means for supporting said sleeve, and means for supporting said implement, and its connected rod section or sections while the latter are being coupled or uncoupled, substantially as specified.

11. In mechanism of the class described, the combination with a support and a driving-wheel carried thereby, of an endwise movable sleeve rotatably connected with said wheel, a tube-cleaning implement, a sectional feed-rod therefor rotatably connected with said sleeve, couplings for the sections of said rod rotatably connected with said wheel, a latch device engaging a groove or recess of said sleeve to support the same, and tongs for supporting said implement and its connected rod section or sections while the latter are being coupled or uncoupled, substantially as specified.

12. In mechanism of the class described, the combination with a support and a driving-wheel carried thereby, of an endwise-movable sleeve rotatably connected with said wheel, a tube-cleaning implement, a sectional feed-rod therefor rotatably connected with said sleeve, couplings for the sections of said rod rotatably connected with said wheel, a guard for said wheel, and a latch pivoted thereto, and engaging a groove or recess of said sleeve to support the same, substantially as specified.

13. In mechanism of the class described, the combination with a support and a driving-wheel carried thereby, of an endwise-movable sleeve rotatably connected with said wheel, a tube-cleaning implement, a sectional feed-rod therefor rotatably connected with said sleeve, couplings for the sections of said rod rotatably connected with said wheel, means for supporting said sleeve, and counterbalancing devices for said implement and its feed-rod, substantially as specified.

14. In mechanism of the class described, the combination with a support and a wheel carried thereby, of an endwise-movable sleeve rotatably connected with said wheel, a tube-cleaning implement, a sectional feed-rod therefor rotatably connected with said sleeve, couplings for the sections of said rod rotatably connected with said wheel, means for driving said wheel, means for supporting said sleeve, a pulley having a driving connection with said wheel, a driving-belt or the like therefor, guide-pulleys for said belt in the manhole of the boiler, and guide-pulleys for said belt intermediate of said first-named pulley, and said manhole, substantially as specified.

15. In mechanism of the class described, the combination with an adjustable support and a driving-wheel carried thereby, of an endwise-movable sleeve rotatably connected with said wheel, a tube-cleaning implement, a sectional feed-rod therefor rotatably connected with said sleeve, couplings for the sections of said rod rotatably connected with said wheel, means for supporting said sleeve, a support above said wheel, a pulley adjustable upon said support, and a rope or cable attached to said feed-rod, passing over said pulley, and having a counterbalancing-weight, substantially as specified.

16. In mechanism of the class described, the combination with an adjustable support and a driving-wheel carried thereby, of an endwise-movable sleeve rotatably connected with said wheel, a tube-cleaning implement, a sectional feed-rod therefor rotatably connected with said sleeve, couplings for the sections of said rod rotatably connected with said wheel, means for supporting said sleeve, means for supporting said implement and its connected rod section or sections while the latter are being coupled or uncoupled, and counterbalancing devices for said implement, and its feed-rod, substantially as specified.

17. In mechanism of the class described, the combination with an adjustable support and a driving-wheel carried thereby, of an endwise-movable sleeve rotatably connected with said wheel, a tube-cleaning implement, a sectional feed-rod therefor rotatably connected with said sleeve, couplings for the sections of said rod rotatably connected with said wheel, a pivoted latch engaging a groove or recess of said sleeve to support the same, tongs for supporting said implement and its connected rod section or sections while the latter are being coupled or uncoupled, and counterbalancing devices for said implement and its feed-rod, substantially as specified.

18. In mechanism of the class described, the combination with a main supporting-bar, an auxiliary supporting-bar at right angles to said first-named bar and having a longitudinal adjustment thereon, a radially-swinging arm pivoted at one end portion thereof to said auxiliary bar, and having a longitudinal adjustment thereon, a wheel at the free extremity of said arm, a wheel upon the pivot of said arm, and having a driving connection with said first-named wheel, and means for driving said wheels, of a tube-cleaning implement, and a feed-rod therefor rotatably connected with said first-named wheel, substantially as specified.

19. In mechanism of the class described, the combination with a main supporting-bar, an auxiliary supporting-bar at right angles to said first-named bar, and having a longitudinal adjustment thereon, a radially-swinging arm pivoted at one end portion thereof to said auxiliary bar, and having a longitudinal adjustment thereon, a wheel at the free extremity of said arm, a wheel upon the pivot of said arm, and having a driving connection with said first-named wheel, and means for driving said wheels, of an endwise-movable sleeve rotatably engaging said first-named wheel, a tube-cleaning implement, a feed-rod therefor rotatably engaging said sleeve, couplings for the sections of said rod rotatably engaging said first-named wheel, and means for supporting said sleeve, substantially as specified.

20. In mechanism of the class described, the combination with a support having a longitudinal keyway, a clamp having a longitudinal adjustment upon said support and having a key of less width than and engaging said keyway to allow a limited pivotal adjustment of said clamp upon said support, a radially-swinging arm pivoted to said clamp, a wheel at the free extremity of said arm, a wheel upon the pivot of said arm, and having a driving connection with said first-named wheel, and means for driving said wheels, of a tube-cleaning implement, and a feed-rod therefor rotatably connected with said first-named wheel, substantially as specified.

21. In mechanism of the class described, the combination with a support having a longitudinal keyway, of an auxiliary support having a key of less width than and engaging said keyway to allow a limited pivotal adjustment of said auxiliary support upon said main support, means for securing said auxiliary support in its adjusted position, a driving-wheel carried by said auxiliary support, a tube-cleaning implement, and a feed-rod therefor having a rotatable connection with said wheel, substantially as specified.

22. In mechanism of the class described, the combination with a support, a radially-swinging arm pivoted to said support, a gear-wheel at the free extremity of said arm, a gear-wheel upon the pivot of said arm and having a driving connection with said first-named wheel, a driving-pulley also upon the pivot of said arm, and a driving-belt or the like for said wheel, of a tube-cleaning implement, a feed-rod therefor having a rotatable connection with said first-named wheel, guide-pulleys for said belt in the manhole of the boiler, and guide-pulleys for said belt intermediate of said manhole, and first-named pulley, substantially as specified.

23. In mechanism of the class described, the combination with a support, a radially-swinging arm pivoted to said support, a wheel at the free extremity of said arm, and a wheel upon the pivot of said arm and having a driving connection with said first-named wheel, of an endwise-movable sleeve rotatably connected with said first-named wheel, a tube-cleaning implement, a sectional feed-rod therefor rotatably connected with said sleeve, couplings for the sections of said rod rotatably connected with said first-named wheel, means for supporting said sleeve, and means for driving said wheel, substantially as specified.

24. In mechanism of the class described, the combination with a support, a radially-swinging arm pivoted to said support, a wheel at the free extremity of said arm, and a wheel upon the pivot of said arm and having a driving connection with said first-named wheel, of an endwise-movable sleeve rotatably connected with said first-named wheel, a tube-cleaning implement, a feed-rod therefor rotatably connected with said sleeve, couplings for the sections of said rod rotatably connected with said first-named wheel, means for supporting said sleeve, means for supporting said implement and its connected rod section or sections while the latter are being coupled or uncoupled, and means for driving said wheel, substantially as specified.

In testimony whereof we affix our signatures in presence of two witnesses.

WILBER D. FORSYTH.
ENOS T. BELL.

Witnesses:
A. FRASER LEGGATE,
JOHN B. STRAYER.